(No Model.)
H. M. WRIGHT.
WHEEL.
No. 411,364. Patented Sept. 17, 1889.
FIG. I.
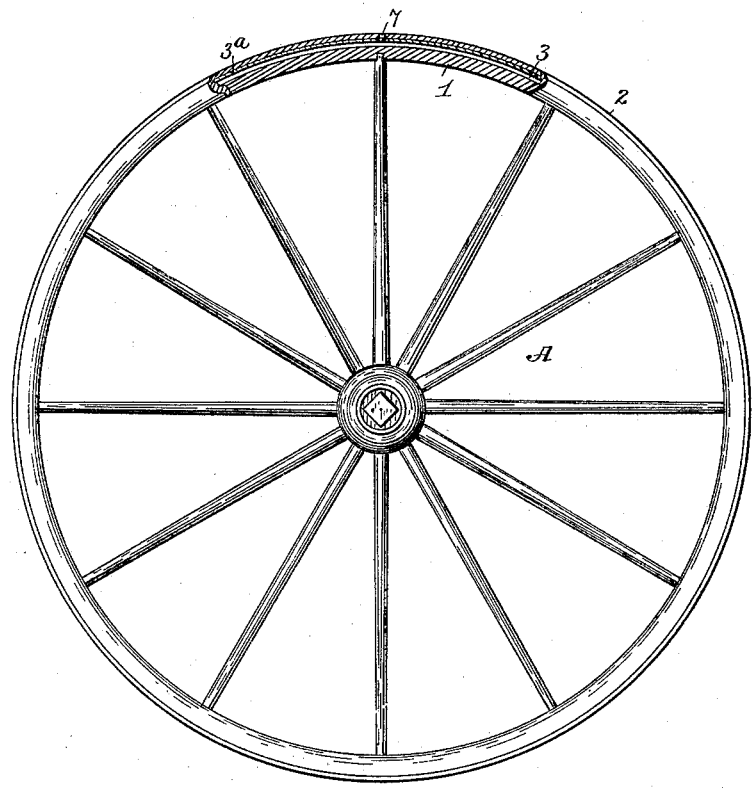
FIG. II.
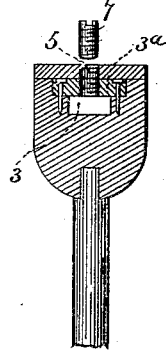
FIG. IV.
FIG. V.
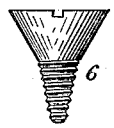
FIG. III.
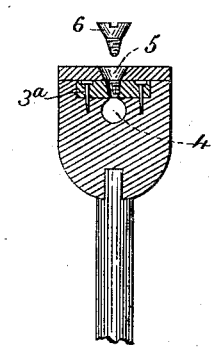
Attest:
Jas. K. McCathran
Geo. L. Wheelock
Inventor:
Henry M. Wright.
by Knight Bros.
attys.
N. PETERS, Photo-Lithographer, Washington, D. C.

UNITED STATES PATENT OFFICE.

HENRY M. WRIGHT, OF QUEEN CITY, MISSOURI.

WHEEL.

SPECIFICATION forming part of Letters Patent No. 411,364, dated September 17, 1889.

Application filed July 2, 1889. Serial No. 316,294. (No model.)

*To all whom it may concern:*

Be it known that I, HENRY M. WRIGHT, a citizen of the United States, residing at Queen City, in the county of Schuyler and State of Missouri, have invented a new and useful Improvement in Wheels, of which the following is a specification.

My invention has for its object to overcome the serious difficulty arising from the effect of changes in the atmosphere upon vehicle-wheels, or arising from the alternate dampening and drying out of such wheels which are washed or drawn through water in the course of use.

My invention relates to a wheel in which is formed an annular reservoir in the felly or rim of the wheel, in which is kept a supply of oil, which gradually permeates and saturates the wood to prevent it taking up moisture. In practice this reservoir is preferably constructed by forming a peripheral groove in the felly, rabbeted at its upper sides, then fitting a strip in the rabbeted portion so that it will be flush with the periphery of the felly, and then setting the tire, which has an opening registering with an opening in the strip and adapted to be closed by a screw or screw-plug.

My invention will be better understood by reference to the accompanying drawings, in which—

Figure I is a side view of the wheel, part being shown sectioned. Fig. II is a sectional view thereof in the plane of the axis. Fig. III is a view similar to Fig. II, showing a modification. Figs. IV and V represent the two forms of screw-plug.

A may represent a wheel having a rim or felly 1 and tire 2. In the felly is formed a peripheral groove 3, of square, round, or other shape, the upper sides of which are rabbeted or offset to receive a strip 3ᵃ, that encircles the whole periphery and is flush with the periphery of the felly, thus providing a passage, as shown in Figs. I and II, or a passage 4, formed concentric with the wheel, as shown in Fig. III.

5 represents the openings in Figs. I and II for the first form, and in Fig. III for the modification, through which the oil is introduced, and this opening extends through the tire and strip and has a screw-thread for the reception of the correspondingly-threaded screw or plug 6 7. It will be observed that in Fig. I it is only necessary to make the hole deeper in order to reach the reservoir. This reservoir is formed separately in the sections of the felly, which is afterward put together in such a manner as to insure the coincidence of the ends of the sections of the reservoir.

Having thus described my invention, the following is what I claim as new therein and desire to secure by Letters Patent:

1. The combination, with a wheel constructed of wood or other permeable material, of the reservoir or passage formed in the felly and surrounded by the wood on all sides and adapted to receive a supply of oil through an opening extending from the periphery of the felly to the same for transmission to the said wheel, and the tire applied over the felly, substantially in the manner explained.

2. The combination, with a wheel, of a reservoir formed in the wooden rim, a strip flush with and encircling the periphery closing said reservoir, and having an opening fitted with a screw-plug for the introduction of oil, substantially as and for the purposes explained.

3. In a wheel, a reservoir formed in the rim, a strip encircling the periphery and closing said reservoir and having an opening, a removable closure for said opening, and the tire applied over the rim and its strip, substantially as set forth.

HENRY M. WRIGHT.

Witnesses:
J. M. LILE,
J. P. LOGAN.